(12) United States Patent
Karges et al.

(10) Patent No.: US 10,131,262 B2
(45) Date of Patent: Nov. 20, 2018

(54) ARMREST WITH CUP HOLDER ASSEMBLY

(71) Applicant: Lear Corporation, Southfield, MI (US)

(72) Inventors: Mark Karges, Macomb, MI (US); Scott Selesky, Columbiaville, MI (US)

(73) Assignee: Lear Corporation, Southfield, MI (US)

( * ) Notice: Subject to any disclaimer, the term of this patent is extended or adjusted under 35 U.S.C. 154(b) by 97 days.

(21) Appl. No.: 15/367,278

(22) Filed: Dec. 2, 2016

(65) Prior Publication Data
US 2018/0154815 A1 Jun. 7, 2018

(51) Int. Cl.
*B60N 3/10* (2006.01)
*B60N 2/75* (2018.01)

(52) U.S. Cl.
CPC ............... *B60N 3/101* (2013.01); *B60N 2/79* (2018.02); *B60N 3/10* (2013.01)

(58) Field of Classification Search
CPC . B60N 3/10; B60N 3/101; B60N 2/75; B60N 2/79; B60N 2/793; B60R 13/0262; A47G 23/02
USPC .................................... 296/1.09, 37.8, 37.15
See application file for complete search history.

(56) References Cited

U.S. PATENT DOCUMENTS

| | | | | |
|---|---|---|---|---|
| 5,275,779 A | * | 1/1994 | Marfilius | B60N 3/10 264/46.6 |
| 7,413,154 B2 | | 8/2008 | Harshman et al. | |
| 8,573,552 B2 | * | 11/2013 | Andersson | B60N 3/10 248/311.2 |
| 9,162,597 B2 | * | 10/2015 | Charles | B29C 69/00 |
| 2014/0158852 A1 | * | 6/2014 | Andersson | B60N 3/102 248/346.03 |

FOREIGN PATENT DOCUMENTS

| | | |
|---|---|---|
| CN | 203974633 U | 12/2014 |
| DE | 19854245 A1 | 5/2000 |
| JP | 2013244949 A | 12/2013 |

* cited by examiner

*Primary Examiner* — Jason S Daniels
(74) *Attorney, Agent, or Firm* — MacMillan, Sobanski & Todd, LLC

(57) ABSTRACT

An armrest assembly with a cup holder includes an armrest frame with a cup holder frame. The assembly also includes a bezel with a bezel cup holder opening. The bezel cup holder opening is adjacent the cup holder frame. The bezel is retained on the armrest frame by a plurality of bracket latches. The assembly also includes a cup holder base. The cup holder base includes a base opening which is adapted to accommodate a beverage container. A base projection substantially surrounds the base opening. At least a portion of the base projection is located in the cup holder frame. The cup holder base is retained on the bezel by a plurality of base latches.

17 Claims, 12 Drawing Sheets

ARMREST WITH CUP HOLDER ASSEMBLY

BACKGROUND OF THE INVENTION

This invention relates in general to vehicle cup holders. In particular, this invention relates to an improved structure for a cup holder assembly supported on a vehicle armrest that can be assembled without the use of tools.

Vehicles, such as passenger cars, often include one or more cup holders for use by an operator and/or passengers therein. Such cup holders provide a convenient location to temporarily store a cup or beverage container. It is desirable that the cup holder be provided in a location that is easily reached by the user. However, it is also desirable that the cup holder be provided in a location that does not interfere with the use of other features in the vehicle.

In the past, vehicle cup holders have been provided in an armrest of a seat. This allows the cup holder to be in easy reach of the occupant of the seat. In an armrest type of cup holder, the cup holder is supported on a movable armrest, such as a pivotable center armrest on a rear bench seat. When the armrest is in a lowered use position relative to the bench seat, the cup holder may be used by occupants on either side thereof. When the armrest is in a raised storage position relative to the bench seat, the cup holder not available for use.

Providing a cup holder in the armrest of a vehicle is known to increase the complexity of the armrest and, as a result, can increase the amount of labor required to assemble the armrest during manufacture. This increased amount of labor can undesirably increase the overall cost of the vehicle. Thus, it would be advantageous to have provide an improved structure for a cup holder assembly supported on a vehicle armrest that can be assembled relatively easily and inexpensively.

SUMMARY OF THE INVENTION

This invention relates to an armrest assembly with a cup holder. The assembly includes an armrest frame with a cup holder frame. The assembly also includes a bezel with a bezel cup holder opening. The bezel cup holder opening is adjacent the cup holder frame. The bezel is retained on the armrest frame by a plurality of bracket latches. The assembly also includes a cup holder base. The cup holder base includes a base opening which is adapted to accommodate a beverage container. A base projection substantially surrounds the base opening. At least a portion of the base projection is located in the cup holder frame. The cup holder base is retained on the bezel by a plurality of base latches.

This invention also relates to an armrest assembly with a cup holder. The assembly includes an armrest frame with a cup holder frame. The assembly also includes a bezel with a bezel cup holder opening. The cup holder opening is adjacent the cup holder frame. The bezel is attached to the armrest frame without the use of tools. The assembly also includes a cup holder base which includes a base opening. The base opening is adapted to accommodate a beverage container. The cup holder base is attached to the bezel without the use of tools.

This invention also relates to a method of assembling an armrest assembly with a cup holder. The method includes moving a bezel in an assembly direction into engagement with an armrest frame. A plurality of bracket latches retains the bezel on the armrest frame. The method also includes moving a cup holder base in the assembly direction into engagement with the bezel. A plurality of base latches retain the cup holder base on the bezel.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
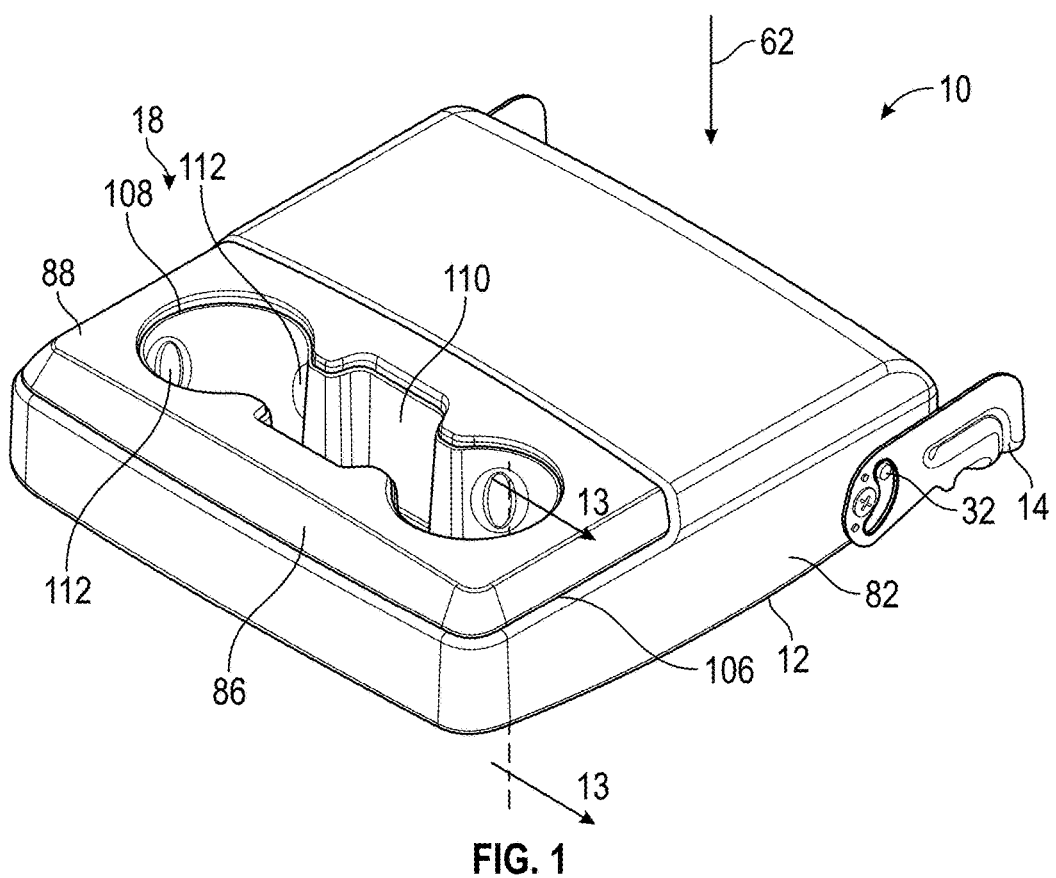
FIG. 1 is a perspective view of an armrest assembly in accordance with this invention.

Referring now to the drawings, there is illustrated in FIG. 1 an armrest assembly, indicated generally at 10, in accordance with this invention. The illustrated armrest assembly 10 is a center armrest for use with a rear bench seat in a vehicle. However, the invention described herein may be used with any type of armrest. The armrest assembly 10 includes an armrest 12 that is mounted to a pair of brackets 14 (only one is visible) for relative pivoting movement. The brackets 14 of the armrest assembly 10 are mounted to a frame (not shown), which can be a portion of a vehicle seat so that the armrest 12 is pivotable relative to the vehicle seat. However, the armrest 12 may be mounted on or relative to any other desired component. The armrest 12 includes a cup holder, indicated generally at 18. The illustrated cup holder 18 includes spaces to accommodate two beverage containers. However, the cup holder 18 may be designed to accommodate any desired number of beverage containers. Additionally, the cup holder 18 may be replaced with any other desired type of storage compartment.

Figure 2:
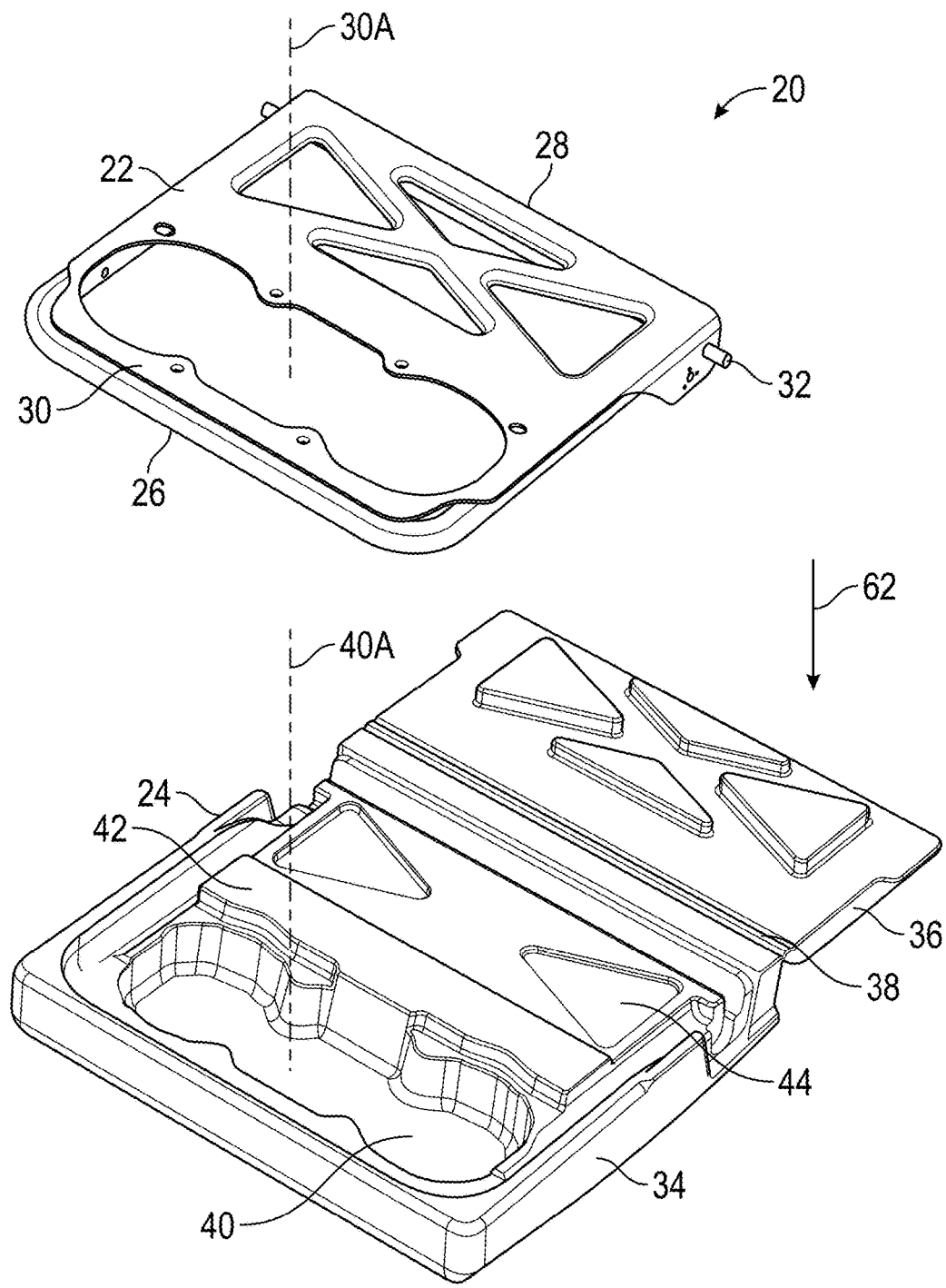
FIG. 2 is an exploded perspective view of portions of the armrest assembly illustrated in FIG. 1.

FIG. 2 is shows an exploded perspective view of a bracket subassembly, indicated generally at 20, of the armrest assembly 10. The bracket subassembly 20 is part of the armrest 12 and includes an armrest frame 22 and an armrest foam 24. The armrest frame 22 includes a formed tube frame 26 that is welded or otherwise secured to a bracket 28. The illustrated formed tube frame 26 and the illustrated bracket 28 are both made of steel, but either or both may be made of any desired material. The armrest frame 22 includes a cup holder frame 30 which defines a cup holder frame axis 30A. The armrest frame 22 also includes a contact rod 32 that, as best shown in FIG. 1, serves to limit movement of the assembled armrest 12 relative to the brackets 14 as is well known in the art. The illustrated contact rod 32 is made of steel and is welded to the bracket 28, but may be made of any desired material and may be attached to the bracket 28 using any desired attachment method.

Referring back to FIG. 2, the illustrated armrest foam 24 is a single piece of molded foam, but may be multiple pieces of foam if desired. The armrest foam 24 includes a foam base 34 and a foam fold-over 36. The foam fold-over 36 is connected to the foam base 34 by a living hinge 38. The material of the armrest foam 24 provides a cushioned body for the assembled armrest 12, but the armrest foam 24 may be made of any desired material providing any desired characteristics for the armrest 12. The foam base 34 includes a cup holder opening 40 on a first side 42 thereof. The cup holder opening 40 defines a foam opening axis 40A that extends substantially perpendicular to the first side 42. The cup holder opening 40 is provided to accommodate the installation of additional components of the armrest 12. The foam base 34 also includes a bracket space 44 on the first side 42 thereof. The bracket space 44 is sized to accommodate a portion of the armrest frame 22.

The illustrated bracket subassembly 20 is assembled by positioning the armrest frame 22 on the first side 42 of the foam base 34 such that a portion of the armrest frame 22 is positioned in the bracket space 44, and the cup holder frame 30 is adjacent to the cup holder opening 40. Thus, the cup holder frame axis 30A is aligned with the foam opening axis 40A. The armrest foam 24 is then folded at the living hinge 38 so that the foam base 34 and the foam fold-over 36 surround a portion of the armrest frame 24. The assembled bracket subassembly 20 is shown in FIG. 3.

Figure 3:
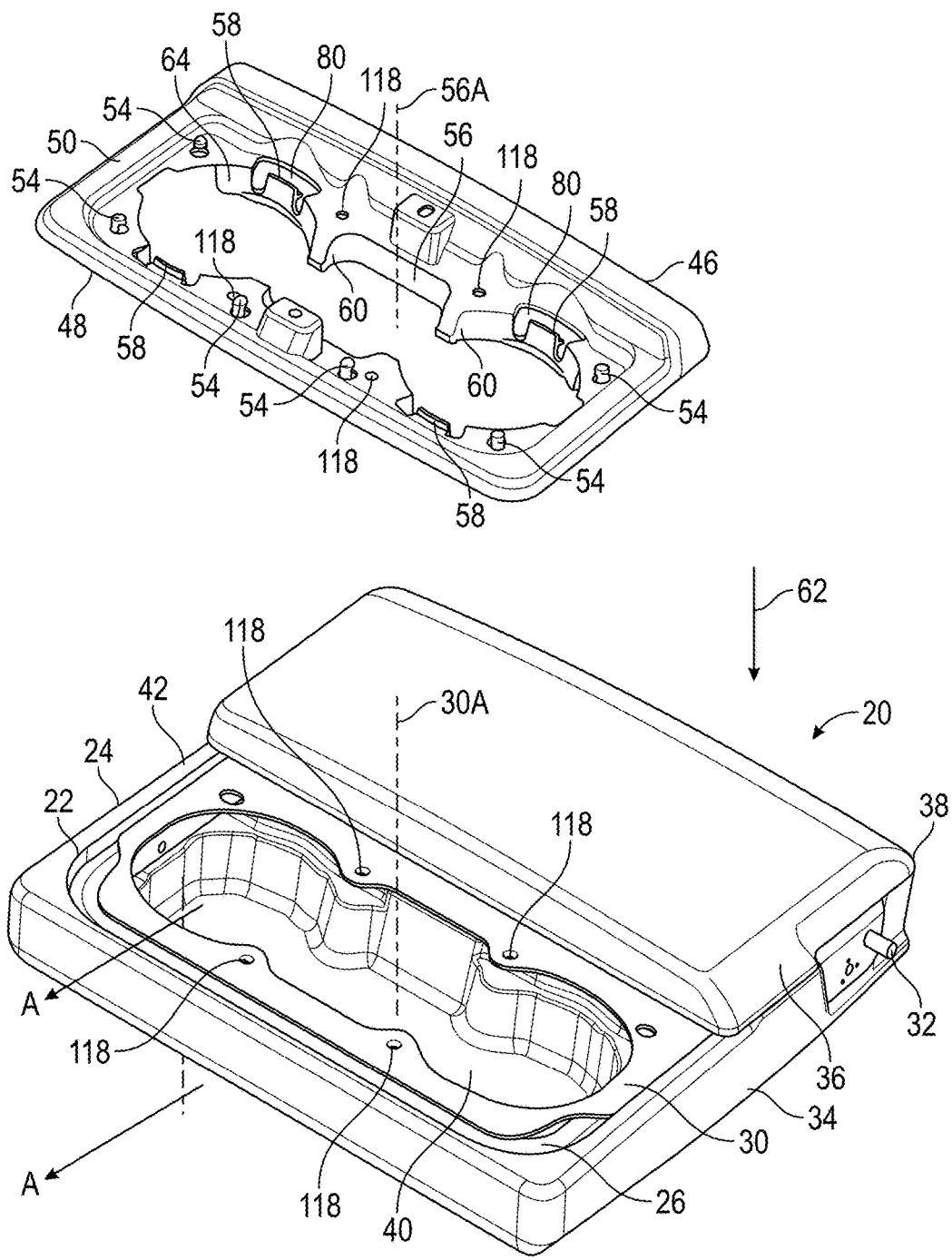
FIG. 3 is an exploded perspective view similar to FIG. 2 showing an assembled bracket subassembly and an uninstalled bezel.

Also shown in FIG. 3 is a bezel 46. The illustrated bezel 46 is molded from plastic, but may be made of any desired material and may be made by any desired process. The bezel 46 includes a lip 48 on a first side 50 of the bezel 46. The lip 48 helps to define the finished appearance of the assembled armrest 12, as will be described below. The bezel 46 includes a plurality of optional trim retainers 54 that extend from the first side 50 of the bezel 46. The illustrated bezel 46 includes six trim retainers 54, but may include any desired number of trim retainers 54. The illustrated trim retainers 54 are integral parts of the molded bezel 46, but may be separate components, if desired. The bezel 46 includes a bezel cup holder opening 56 that defines a cup holder bezel axis 56A.

The bezel 46 includes a plurality of bracket latches 58. The illustrated bezel 46 includes four bracket latches 58, but may include any desired number of bracket latches 58. The illustrated bracket latches 58 are integral parts of the molded bezel 46, but may be separate components if desired. The bracket latches 58 are located on a perimeter of the cup holder opening 56 and will be described in detail below. The bezel 46 also includes a plurality of base latches 60. The illustrated bezel 46 includes four base latches 60 (only two are visible in FIG. 3), but may include any desired number of base latches 60. The illustrated base latches 60 are integral parts of the molded bezel 46, but may be separate components, if desired. The base latches 60 are located on the perimeter of the cup holder opening 56 and will also be described in detail below.

In order to attach the bezel 46 to the bracket subassembly 20, the bezel 46 is positioned adjacent to the cup holder frame 30 with the cup holder bezel axis 56A generally aligned with the cup holder frame axis 30A, and with the first side 50 of the bezel 46 facing away from the first side 42 of the foam base 34. This is the arrangement shown in FIG. 3. The bezel 46 is then moved in an assembly direction 62 toward the bracket subassembly 20 so that the bracket latches 58 engage the cup holder frame 30. This is shown in FIG. 4, which is a cross-sectional view taken along the line A-A of FIG. 3 after the bezel 46 has initially engaged the cup holder frame 30.

Figure 4:
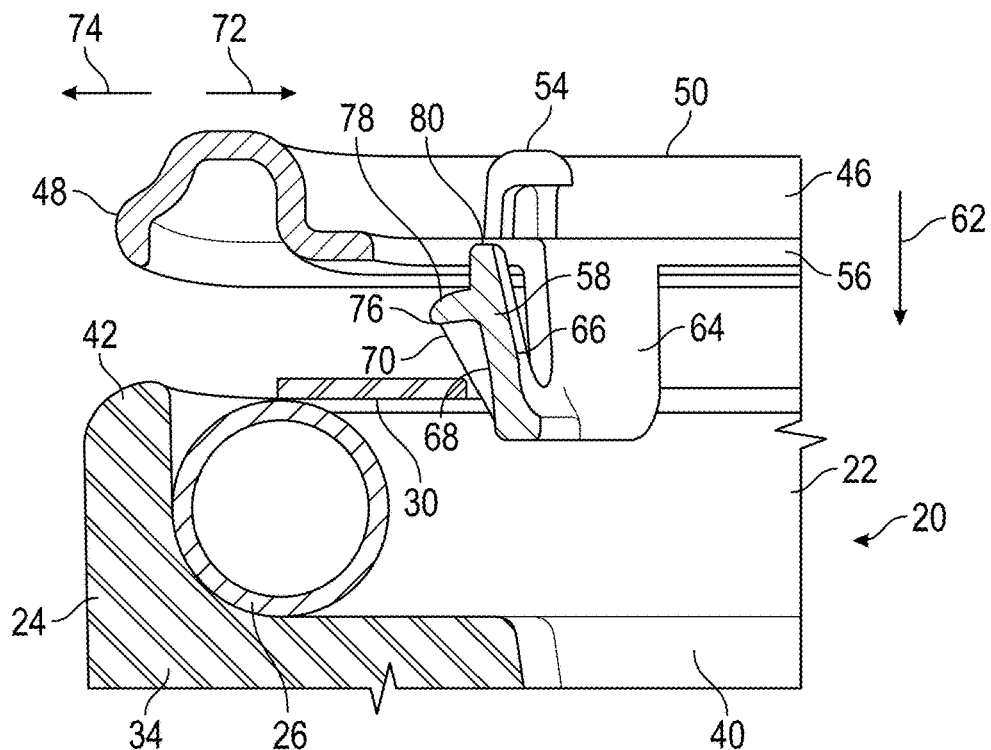
FIG. 4 is an enlarged cross-sectional view of the bezel illustrated in FIG. 3 prior to being installed on the bracket subassembly.
Figure 6:
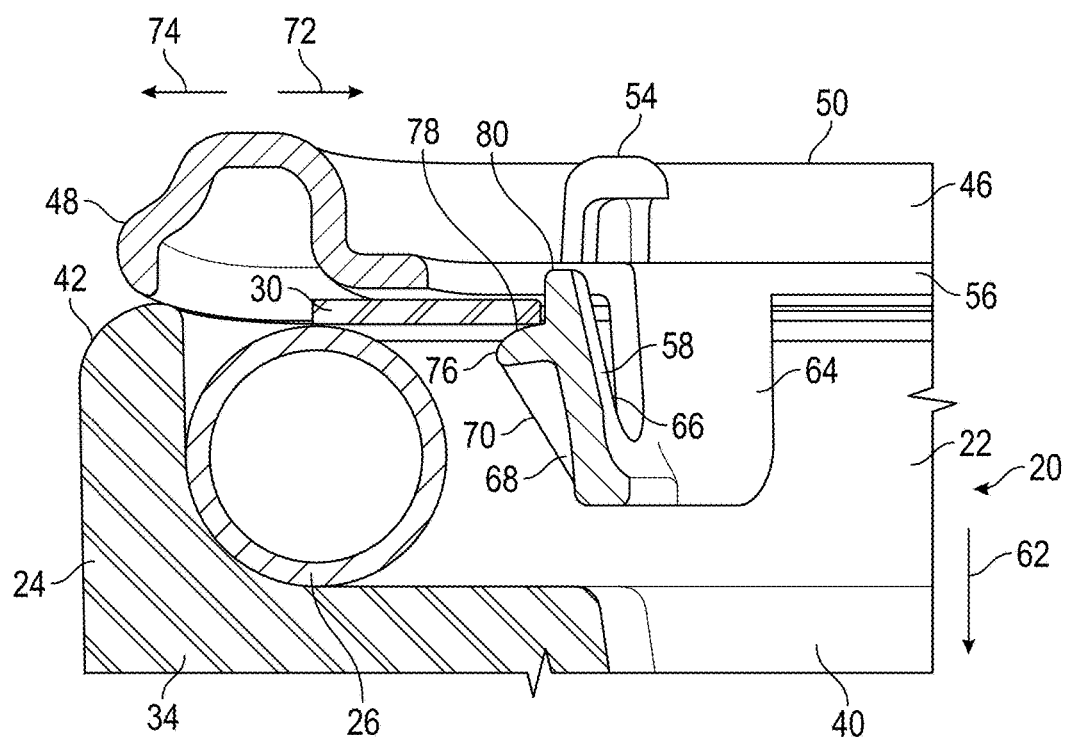
FIG. 6 is an enlarged cross-sectional view similar to FIG. 5 showing the bezel fully installed on the bracket subassembly.

The cross-sectional view shown in FIG. 4 is taken through one of the bracket latches 58. The bezel 46 includes a bezel extension 64 that extends in the assembly direction 62. The bracket latch 58 is connected to the bezel extension 64. When the bezel 46 is connected to the bracket subassembly 20, the bezel extension 64 is positioned inside the cup holder frame 30, as shown in FIG. 6. The bracket latch 58 extends from the bezel extension 64 back toward the first side 50 of the bezel 46 in a direction that is opposite to the assembly direction 62. The bracket latch 58 includes an inner side 66, which generally faces into the cup holder opening 56 of the bezel 46, and an outer side 68, which generally faces out of the cup holder opening 56. The outer side 68 of the bracket latch 58 includes a bracket guide 70, which is the portion of the bracket latch 58 that engages the bracket subassembly 20. The bracket guide 70 is angled relative to the assembly direction 62, and the outer side 68 of the bracket latch 58 slopes outwardly, moving farther away from the cup holder opening 56 as it approaches the first side 50 of the bezel 46. It should be appreciated that the engagement of the four illustrated bracket latches 58 with the bracket subassembly 20 will help to properly position the bezel 46 relative to the bracket subassembly 20 and will align the cup holder bezel axis 56A with the cup holder frame axis 30A.

Figure 5:
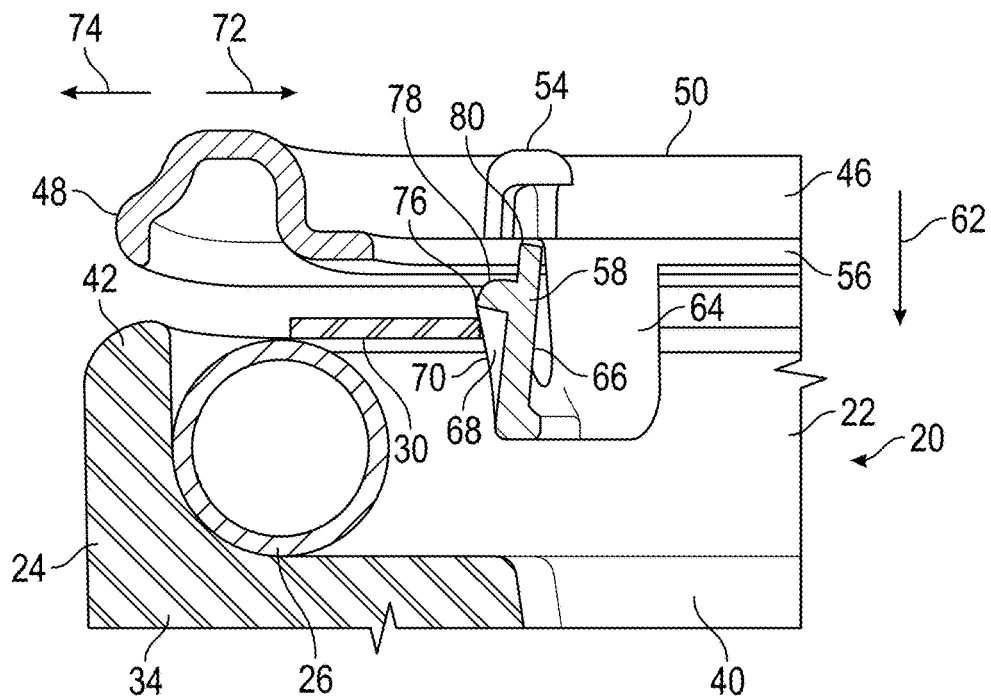
FIG. 5 is an enlarged cross-sectional view similar to FIG. 4 showing the bezel partially installed on the bracket subassembly.

As the bezel 46 is moved farther in the assembly direction 62 relative to the bracket subassembly 20, the bracket subassembly 20 will apply a force on the bracket latch 58 that is opposite to the assembly direction 62. This force will cause the bracket latch 58 to bend relative to the bezel extension 64 and to deflect inwardly toward the cup holder opening 56. This condition is shown in the cross-sectional view shown in FIG. 5, wherein the bracket latch 58 is shown deflected in an inward direction 72 toward the cup holder opening 56. As a result of the sloped orientation of the bracket guide 70, as the bracket latch 58 is moved farther in the assembly direction 62, it is deflected farther in the inward direction 72.

As previously described, the bezel 46, including the bezel extension 64 and the bracket latch 58, may be molded from plastic. The amount of force required to deflect the bracket latch 58 will depend, in part, on the material the bezel 46 is made from and the thickness of the bracket latch 58. Additionally, the amount of force required to connect the bezel 46 to the bracket subassembly 20 will depend on the total number of bracket latches 58. Any of these properties may be selected to obtain a desired amount of required force for assembly.

The bracket guide 70 extends in an outward direction 74, which is opposite the inward direction 72, to a bracket guide outer end 76. The bracket latch 58 includes a bracket hook 78 that extends in the outward direction 74 to the bracket guide outer end 76. As the bezel 46 is moved farther in the assembly direction 62 relative to the bracket subassembly 20, the bracket guide outer end 76 will engage the cup holder frame 30, and then will move in the assembly direction 62 past the cup holder frame 30. The force applied to the guide 70 will be removed, and the bracket latch 58 will be able to elastically rebound in the outward direction 74. This condition is shown in the cross-section illustrated in FIG. 6.

FIG. 6 shows the bezel 46 in its installed position relative to the bracket subassembly 20. The bracket latch 58 includes an end projection 80 that engages the cup holder frame 30 of the bracket subassembly 20 and prevents further rebound of the bracket latch 58 in the outward direction 74. The bracket hook 78 is positioned adjacent to the cup holder frame 30 in the assembly direction 62 and prevents the bezel 46 from being moved away from the bracket subassembly 20 in the direction opposite the assembly direction 62. However, a force may be applied to the end projection 80 of the bracket latch 58 in the inward direction 72 in order to allow the bezel 46 to be removed from the bracket subassembly 20, if desired.

Figure 7:
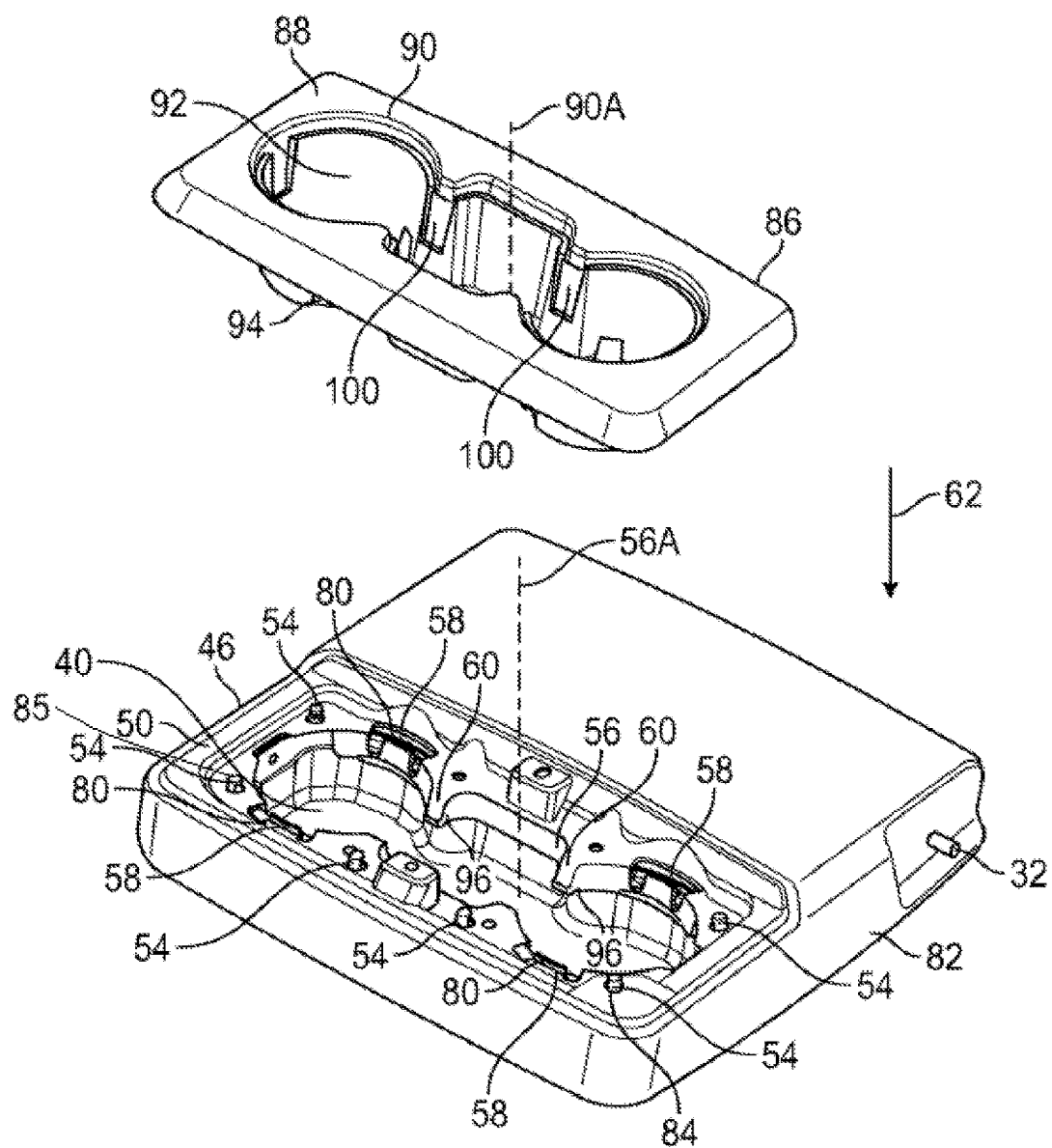
FIG. 7 is a perspective view showing the bezel fully installed on the bracket subassembly, a trim cover surround installed on the bezel, and a cup holder base prior to being installed on the bezel.

Referring now to FIG. 7, a perspective view of the bracket subassembly 20 with the attached bezel 46 is shown. An optional trim cover 82 has also been attached over the bracket subassembly 20. The majority of the trim cover 82 is illustrated cut-away around the bezel 46 so that the underlying components are visible. The illustrated trim cover 82 is a single-piece surround that is made of fabric, but the trim cover 82 may be made of multiple pieces and may be made of any desired material. The trim cover 82 serves to provide a finished outer appearance to the armrest 12 and may have any desired texture and color. Additionally, the illustrated trim cover 82 serves to retain the foam fold-over 36 in position relative to the foam base 34. This can be best appreciated in reference to FIG. 3, which shows the foam fold-over 36 in its folded position adjacent to the first side 42 of the foam base 34. In the illustrated embodiment, no adhesives or other fasteners are used to retain the foam fold-over 36 in this position. Referring back to FIG. 7, the trim cover 82 surrounds the foam base 34 and the foam fold-over 36 and retains them in their relative positions. As previously stated, the trim cover 82 is optional, and the foam base 34 and the foam fold-over 36 may be retained in their desired positions by any desired fastener.

The trim cover 82 also extends over a portion of the bezel 46. The trim cover 82 includes a plurality of hook openings 84 (one of which is shown in FIG. 7 in the portion of the trim cover 82 that is illustrated over the bezel 46). Each of the plurality of hook openings 84 is retained on one of the trim retainers 54 on the bezel 46. Each of the trim retainers 54 includes a hook 85 that extends inwardly toward the cup holder opening 56. As shown in FIG. 7, the hook 85 is inserted through one of the hook openings 84 on the trim cover 82, and the trim retainers 54 help retain the trim cover 82 in position.

The armrest 12 also includes a cup holder base 86, shown in FIG. 7. The illustrated cup holder base 86 is molded from plastic, but may be made of any desired material and may be made by any desired process. The cup holder base 86 includes a first side 106 (see FIG. 11) that is a finished side of the cup holder base 86. The first side 88 is the visible side of the cup holder base 86 when the armrest 12 is assembled and may have any desired finish and appearance. The cup holder base 86 includes a base outer edge 88 that surrounds the first side 88. The cup holder base 86 also includes a base opening 90 which defines a cup holder base axis 90A. The cup holder base 86 includes a base projection 92 that extends in the assembly direction 62. The base projection 92 substantially surrounds the base opening 90.

Figure 8:
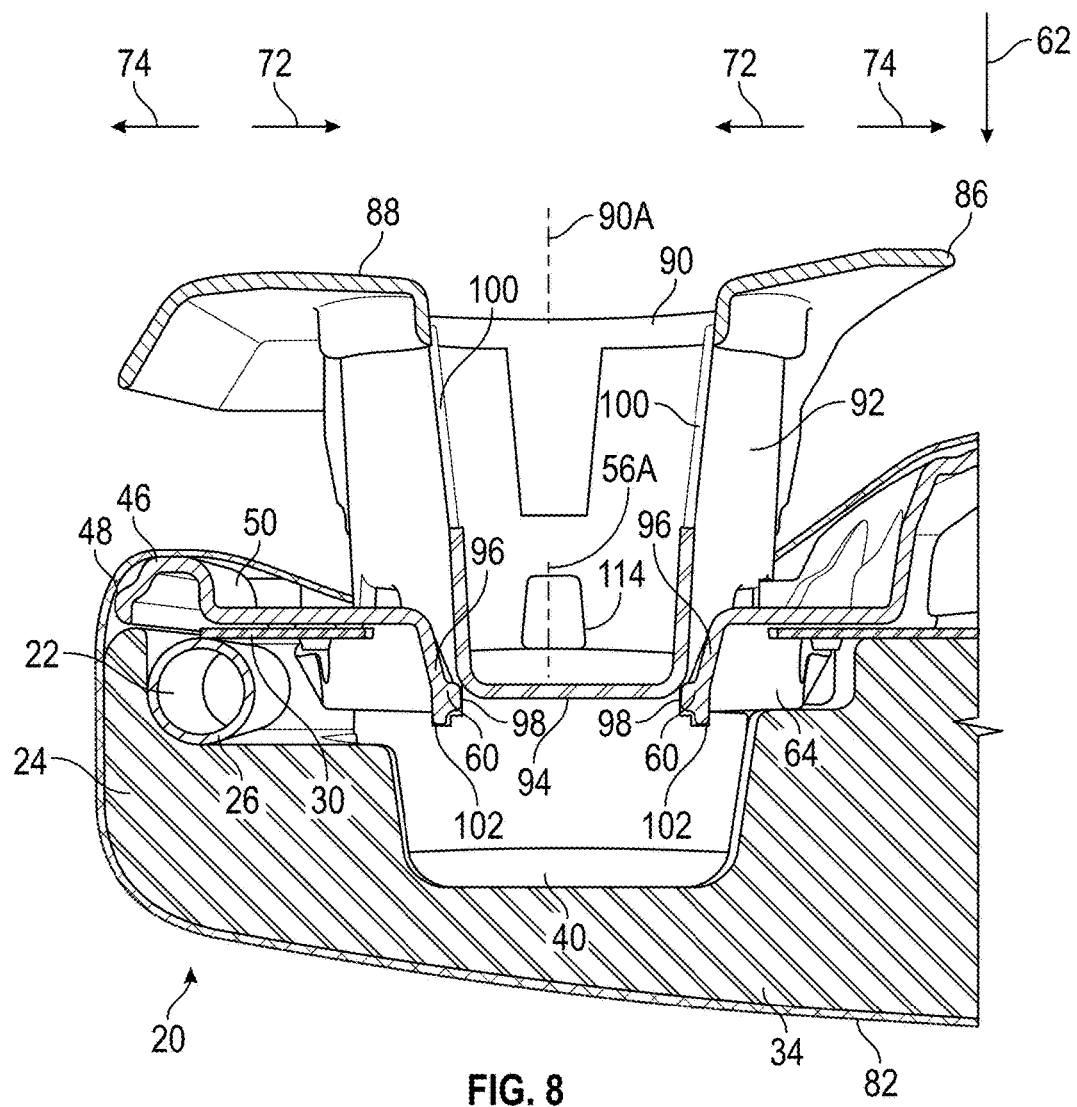
FIG. 8 is an enlarged cross-sectional view of the cup holder base prior to being installed on the bezel.

To attach the cup holder base 86 to the bracket subassembly 20 and the bezel 46, the cup holder base 86 is initially positioned adjacent to the bezel 46 with the cup holder base axis 90A generally aligned with the cup holder bezel axis 56A, and with the first side 88 of the cup holder base 86 facing away from the first side 50 of the bezel 46, as shown in FIG. 7. The cup holder base 86 is then moved in the assembly direction 62 toward the bezel 46 so that the base latches 60 on the bezel 46 engage the cup holder base 86. This is shown in FIG. 8, which is an enlarged cross-sectional view of the cup holder base 86 prior to being installed on the bezel 46.

The base projection 92 of the cup holder base 86 extends in the assembly direction 62 to a base bottom 94. As previously described, the base projection 92 substantially surrounds the base opening 90, and the base bottom 94 connects the sides of the base projection 92 to substantially close one side of the base opening 90. A portion of the base projection 92 is located within the bezel cup holder opening 56. As previously described, the base latches 60 on the bezel 46 are located on the perimeter of the cup holder opening 56. Each of the base latches 60 has an inner side 96 that extends in the assembly direction 62 and in the inward direction 72. As the cup holder base 86 is moved in the assembly direction 62 relative to the bezel 46, it engages the base latches 60. The base latches 60 will help to properly position the cup holder base 86 relative to the bezel 46 and will align the cup holder base axis 90A with the cup holder bezel axis 56A.

Figure 9:
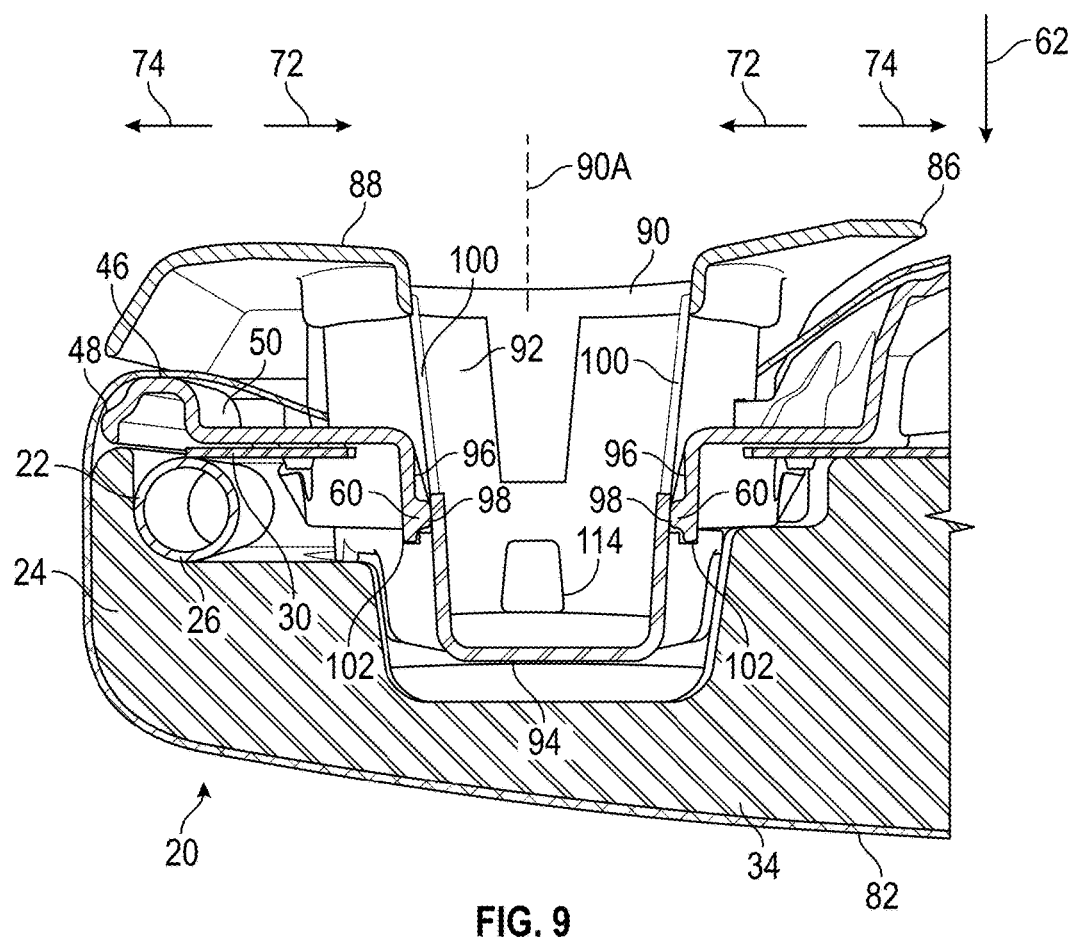
FIG. 9 is an enlarged cross-sectional view similar to FIG. 8 showing the cup holder base partially installed on the bezel.

As the cup holder base 86 is moved farther in the assembly direction 62 relative to the bezel 46, the cup holder base 86 will apply a force to the base latches 60 that will cause the base latches 60 to deflect in the outward direction 74. This condition is shown in FIG. 9. Each of the base latches 60 includes a base hook 98 that extends in the inward direction 72. The base hooks 98 are the portions of the base latches 60 that engage the base projection 92 as the base latches 60 are deflected. The base projection 92 includes a plurality of base slots 100. The illustrated cup holder base 86 includes four base slots 100, two of which are visible in FIGS. 8 and 9. However, the cup holder base 86 may include any desired number of base slots 100. The cross-sectional view shown in FIG. 9 is taken through two of the base latches 60 on the bezel 46, as well as through two of the base slots 100 on the cup holder base 86.

Figure 10:
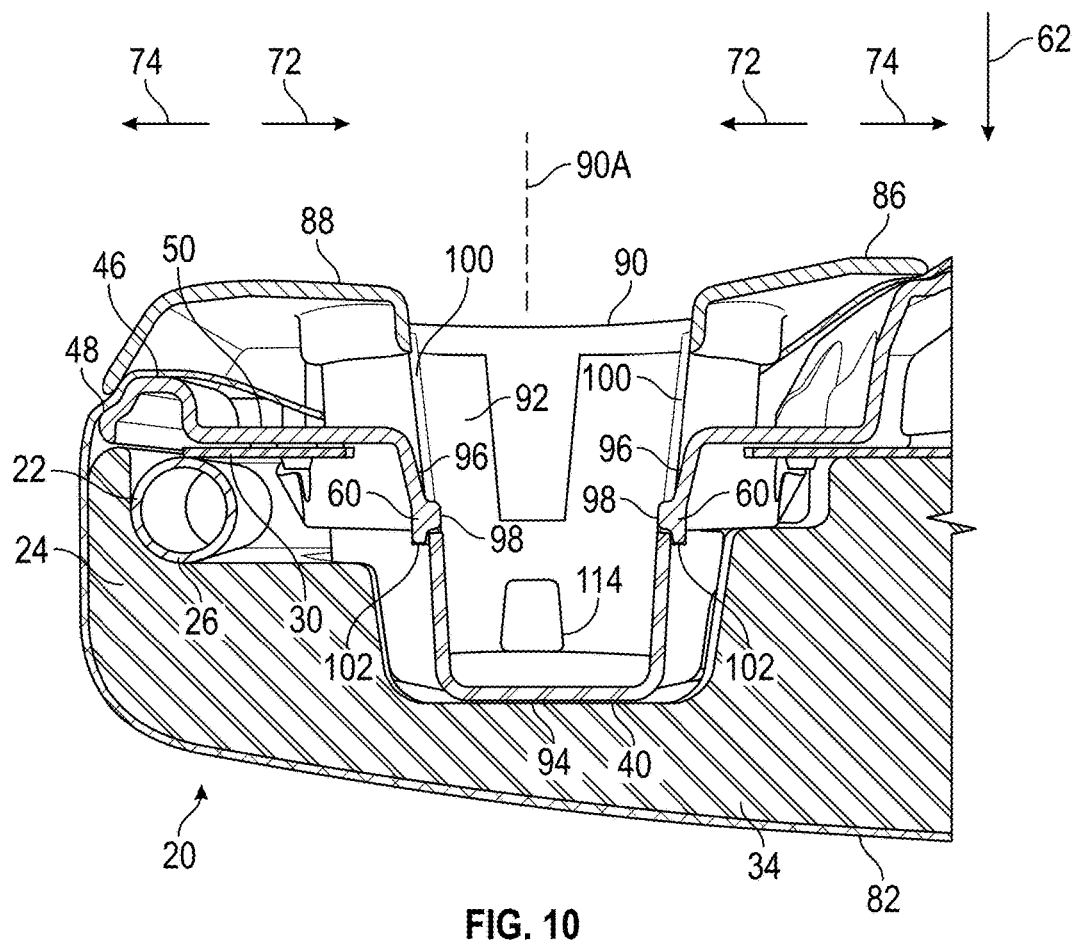
FIG. 10 is an enlarged cross-sectional view similar to FIG. 9 showing the cup holder base fully installed position on the bezel.

As the cup holder base 86 is moved farther in the assembly direction 62 relative to the bezel 46, the base hooks 98 will enter the base slots 100, as shown in FIG. 10. This will allow the base latches 60 to rebound in the inward direction 72. FIG. 10 shows the cup holder base 86 in its installed position relative to the bezel 46 and the bracket subassembly 20. Each base latch 60 includes an end projection 102 that engages the base projection 92 and prevents further rebound of the respective base latch 60 in the inward direction 72. Each of the base hooks 98 is located in one of the base slots 100 and engages the end projection 102 to prevent the cup holder base 86 from moving away from the bezel 46 in the direction opposite to the assembly direction 62. As shown in FIG. 10, the illustrated base slots 100 are larger than the base hooks 98. The increased size of the base slots 100 allows a force to be applied to the inner side 96 of the base latch 60 in order to deflect the base latch 60 in the outward direction 74. This allows the cup holder base 86 to be removed from the bezel 46, if desired.

Figure 11:
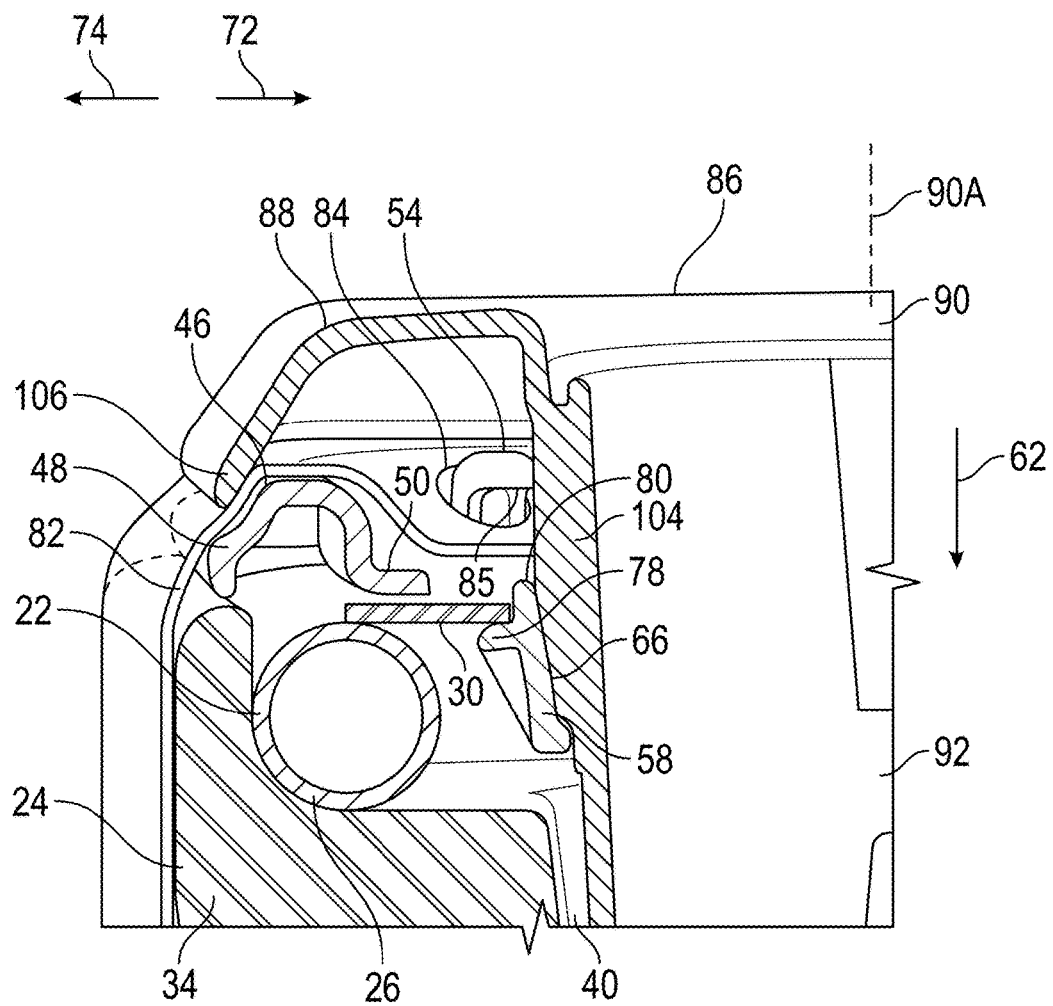
FIG. 11 is an enlarged cross-sectional view of a secondary lock provided on the cup holder base.

Referring to FIG. 11, a cross-sectional view similar to FIG. 6 is illustrated, with the addition of the cup holder base 86 installed over the bezel 46. As previously described, the bezel 46 may be removed from the bracket subassembly 20 by applying a force to the end projection 80 of the bracket latch 58 to cause the bracket latch 58 to deflect in the inward direction 72. The cup holder base 86 includes a secondary lock 104 that serves to prevent deflection of the bracket latch 58. The illustrated secondary lock 104 is a portion of the base projection 92 that is adjacent to the inner side 66 of the bracket latch 58. A force applied to the bracket latch 58 that attempts to deflect the bracket latch 58 in the inward direction 72 will be resisted by the secondary lock 104. Therefore, the bezel 46 will be prevent from being released from the bracket subassembly 20 as long as the cup holder base 86 is attached to the bezel 46.

Also shown in FIG. 11, the base outer edge 106 of the cup holder base 86 is positioned near the lip 48 of the bezel 46, with the trim cover 82 located therebetween. The base outer edge 106 helps to hold the trim cover 82 in position relative to the lip 48, and the lip 48 is able to provide the trim cover 82 with a smooth appearance when it engages the bezel 46.

Figure 12:
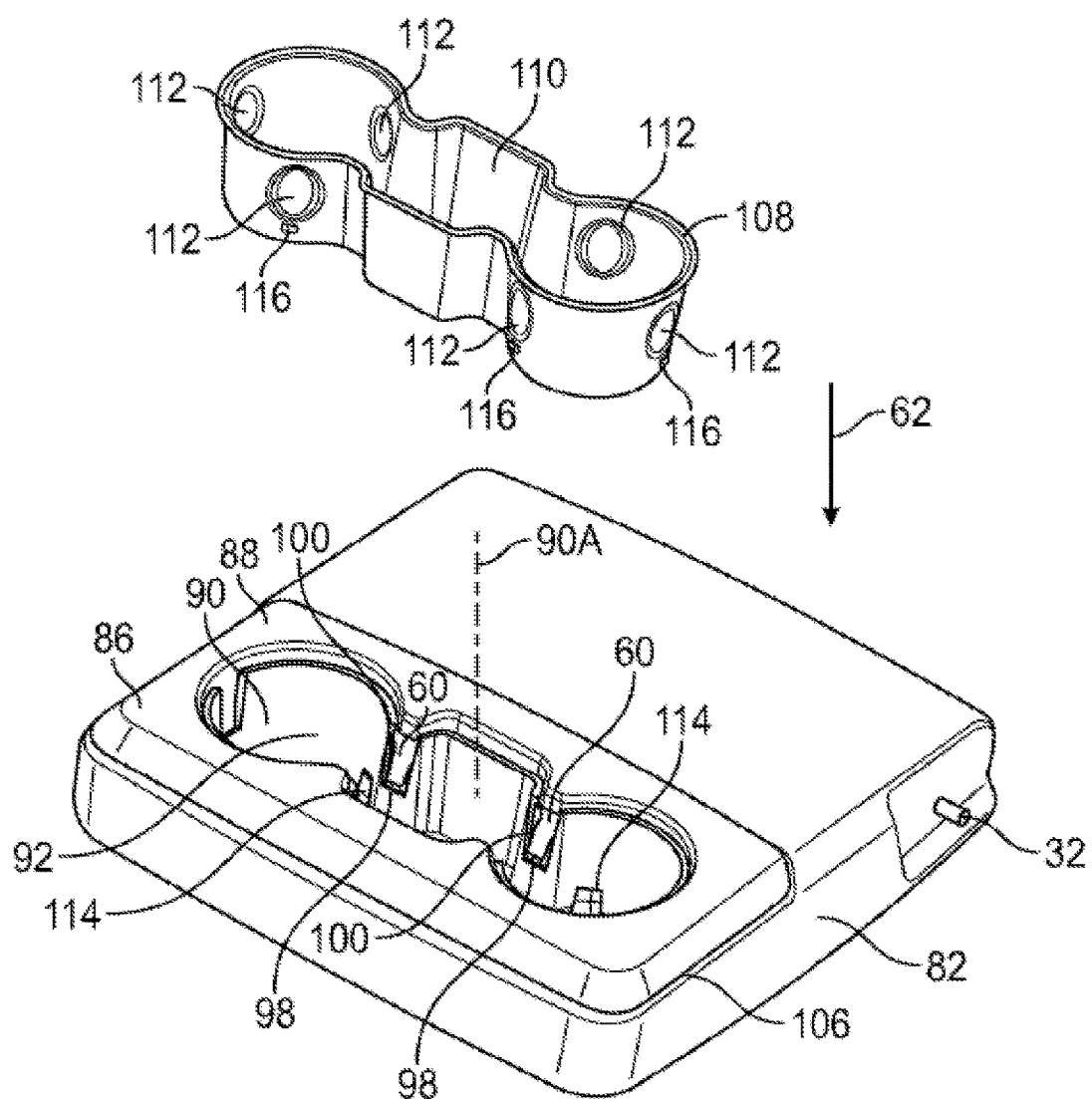
FIG. 12 is a perspective view similar to FIG. 7 showing the cup holder base fully installed position on the bezel and a cup holder liner prior to being installed on the cup holder base.

Referring now to FIG. 12, a perspective view showing the cup holder base 86 installed on the bracket subassembly 20 and the bezel 46 is shown. As previously described, the inner sides 96 of the base latches 60 are visible through the respective base slots 100. The armrest 12 also includes a cup holder liner 108. The illustrated cup holder liner 108 is made of rubber, but may be made of any desired material. The cup holder liner 108 includes liner walls that define an interior space 110. The illustrated cup holder liner 108 provides a container that is only open on one side in order to catch debris and prevent it from getting into the armrest 12. However, the cup holder liner 108 may have any desired configuration. The cup holder liner 108 is intended to be removable from the armrest 12 in order to allow the cup holder liner 108 to be cleaned when desired. The cup holder liner 108 may have any desired finish or appearance. The illustrated cup holder liner 108 includes optional inward projections 112 that serve to engage and retain a beverage container.

The cup holder liner 108 is installed in the cup holder base 86 by inserting the cup holder liner 108 into the base opening 90. The cup holder base 86 includes a plurality of projection slots 114 (two of which are visible in FIG. 12), and the cup holder liner 108 includes a corresponding plurality of liner projections 116 (three of which are visible in FIG. 12). The cup holder liner 108 is shown installed in the cup holder base 86 in FIGS. 1 and 13.

Figure 13:
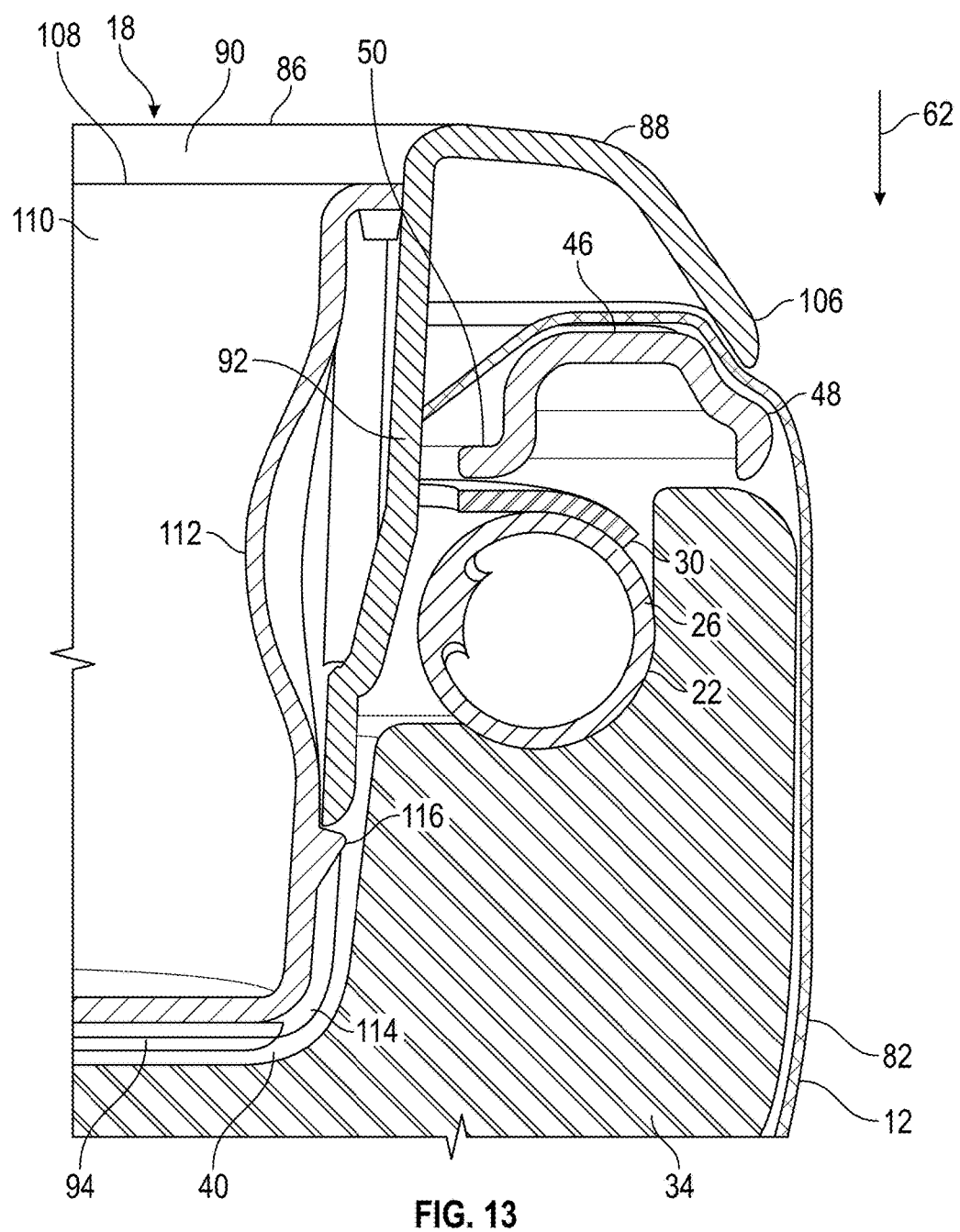
FIG. 13 is a cross-sectional view taken along line 13-13 of FIG. 1.

A cross-sectional view taken along the line 13-13 of FIG. 1 is shown in FIG. 13. This cross-sectional view is taken through one of the inward projections 112 of the cup holder liner 108. Additionally, the engagement of one of the liner projections 116 with one of the projection slots 114 is shown. As previously described, the cup holder liner 108 is made of a relatively resilient material. Thus, the user may remove the cup holder liner 108 from the cup holder base 86 by deforming the cup holder liner 108 and pulling it the direction opposite the assembly direction 62.

The above-described armrest 12 is advantageous in that it allows portions of the armrest 12 to be assembled without the use of tools. Referring back to FIG. 2, the armrest frame 22 may be placed next to the armrest foam 24. The foam fold-over 36 may then be folded over a portion of the armrest frame 22 to put the bracket subassembly 20 in the condition shown in FIG. 3. The bezel 46 may then be moved in the assembly direction 62 onto the exposed bracket 28. The bracket latches 58 on the bezel 46 will engage the bracket 28 and snap into place. The bezel 46 has then been attached to the armrest frame 22 without the use of tools. The trim cover 82 may then be slid around the assembly and hooked onto the trim retainers 54 on the bezel 46. This will put the assembly in the condition shown in FIG. 7. The cup holder base 86 may then be moved in the assembly direction 62 onto the exposed bezel 46. The base latches 60 on the bezel 46 will engage the cup holder base 86 and snap into place. The cup holder base 86 has then been attached to the bracket subassembly 20 without the use of tools. This will also capture the trim cover 82 between the bezel 46 and the cup holder base 86. Finally, the cup holder liner 108 may be inserted into the base opening 90.

The armrest 12 may also be disassembled without the use of tools. The cup holder liner 108 may be removed from the base opening 90, which puts the armrest 12 in the condition shown in FIG. 12. A force may be applied to the inner side 96 of each of the base latches 60 in order to allow the cup holder base 86 to be moved away from the bezel 46, which puts the assembly in the condition shown in FIG. 7. The trim cover 82 may be unhooked from the trim retainers 54 and the bezel 46 exposed. A force may be applied to each of the bracket latches 58 to allow the bezel 46 to be moved away from the bracket subassembly 24, which puts the assembly in the condition shown in FIG. 3.

Referring to FIG. 3, the bracket subassembly 24 and the bezel 46 include a plurality of optional fastener guides 118. The fastener guides 118 are provided to allow the bezel 46 to be fixed relative to the bracket subassembly 24 using screws, or any other desired fastener. This may be desirable if, for example, parts of the armrest 12 have become damaged or worn and otherwise will not remain together as desired.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An armrest assembly comprising:
   an armrest frame that includes a cup holder frame;
   a bezel that includes a bezel cup holder opening that is adjacent to the cup holder frame, the bezel retained on the armrest frame by a plurality of bracket latches; and
   a cup holder base that includes a base opening which is adapted to accommodate a beverage container, the cup holder base also including a base projection that substantially surrounds the base opening, wherein at least a portion of the base projection is located in the cup holder frame, the cup holder base being retained on the bezel by a plurality of base latches, wherein the cup holder base further includes a secondary lock that prevents at least one of the plurality of bracket latches from disengaging from the armrest frame.

2. The armrest assembly of claim 1, wherein the plurality bracket latches is located on the bezel and engage the armrest frame.

3. The armrest assembly of claim 2, wherein the plurality of base latches is located on the bezel and engage the cup holder base.

4. The armrest assembly of claim 3, wherein the secondary lock is a portion of the base projection that engages the at least one of the plurality of bracket latches.

5. The armrest assembly of claim 1, the cup holder base further including a secondary lock that prevents at least one of the plurality of bracket latches from disengaging from the armrest frame.

6. The armrest assembly of claim 5, wherein the secondary lock is a portion of the base projection that engages the at least one of the plurality of bracket latches.

7. The armrest assembly of claim 1, further comprising an armrest foam that surrounds a portion of the armrest frame, the armrest foam including a cup holder opening that is adjacent the cup holder frame.

8. The armrest assembly of claim 7, further comprising a trim cover that surrounds the armrest foam and is retained on the bezel, wherein a portion of the trim cover is located between the bezel and the cup holder base.

9. The armrest assembly of claim 8, the bezel further including a plurality of trim retainers that engage the trim cover.

10. The armrest assembly of claim 8, the armrest foam including a foam base and a foam fold-over which surround the portion of the armrest frame and are connected by a living hinge.

11. An armrest assembly comprising:
an armrest frame that includes a cup holder frame;
a bezel which includes a bezel cup holder opening that is adjacent the cup holder frame, the bezel attached to the armrest frame without the use of tools; and
a cup holder base which includes a base opening which is adapted to accommodate a beverage container, the cup holder base attached to the bezel without the use of tools, wherein the armrest foam including a foam base and a foam fold-over which surround the portion of the armrest frame and are connected by a living hinge.

12. The armrest assembly of claim 11, further comprising an armrest foam that surrounds a portion of the armrest frame, the armrest foam including a cup holder opening that is adjacent the cup holder frame.

13. The armrest assembly of claim 12, further comprising a trim cover that surrounds the armrest foam and is retained on the bezel, wherein a portion of the trim cover is located between the bezel and the cup holder base.

14. The armrest assembly of claim 13, the bezel further including a plurality of trim retainers that engage the trim cover.

15. A method of assembling an armrest assembly comprising the steps of:
moving a bezel in an assembly direction into engagement with an armrest frame so that a plurality of bracket latches retain the bezel on the armrest frame;
moving a cup holder base in the assembly direction into engagement with the bezel so that a plurality of base latches retain the cup holder base on the bezel; and
folding an armrest foam around a portion of the armrest frame.

16. The method of claim 15, further comprising: placing a trim cover around the armrest foam.

17. The method of claim 16, further including the step of retaining the trim cover on the bezel.

* * * * *